United States Patent
Sarir et al.

(10) Patent No.: US 10,713,008 B2
(45) Date of Patent: Jul. 14, 2020

(54) METHODS AND SYSTEMS FOR TRANSFERRING A SESSION BETWEEN AUDIBLE INTERFACE AND VISUAL INTERFACE

(71) Applicant: The Toronto-Dominion Bank, Toronto (CA)

(72) Inventors: Nasim Sarir, Thornhill (CA); Steven Gervais, Newmarket (CA); Peter Horvath, Toronto (CA); Ekas Kaur Rai, Brampton (CA); Peter John Alexander, Toronto (CA); Arun Victor Jagga, Toronto (CA)

(73) Assignee: THE TORONTO-DOMINION BANK, Toronto (CA)

(*) Notice: Subject to any disclaimer, the term of this patent is extended or adjusted under 35 U.S.C. 154(b) by 0 days.

(21) Appl. No.: 16/104,302

(22) Filed: Aug. 17, 2018

(65) Prior Publication Data
US 2020/0057602 A1    Feb. 20, 2020

(51) Int. Cl.
*G06F 3/16* (2006.01)
*G06F 9/451* (2018.01)
*H04L 29/06* (2006.01)

(52) U.S. Cl.
CPC .............. *G06F 3/167* (2013.01); *G06F 9/453* (2018.02); *H04L 63/0876* (2013.01)

(58) Field of Classification Search
CPC ....... G06F 3/167; G06F 9/453; H04L 63/0876
See application file for complete search history.

(56) References Cited

U.S. PATENT DOCUMENTS

| | | | |
|---|---|---|---|
| 2008/0148367 A1* | 6/2008 | Hilerio | G06F 9/453 726/5 |
| 2012/0218287 A1* | 8/2012 | McWilliams | G06F 15/0291 345/619 |
| 2016/0065573 A1* | 3/2016 | Bulusu | G06F 21/00 726/5 |

OTHER PUBLICATIONS

Santos, "VLC Media Player for iPad available for download", (Sep. 21, 2010), <URL: https://en.softonic.com/articles/vlc-media-player-for-ipad-available-for-download/>, p. 1-2 (Year: 2010).*
Martin, "How to listen to audiobooks on Google Home", (Jan. 23, 2018), <URL: https://www.cnet.com/how-to/how-to-listen-to-audiobooks-on-google-home/>, p. 1-4 (Year: 2018).*

* cited by examiner

*Primary Examiner* — Ajay M Bhatia
*Assistant Examiner* — Mong-Shune Chung
(74) *Attorney, Agent, or Firm* — Ridout & Maybee LLP

(57) ABSTRACT

Methods and systems for transferring a user session between at least two electronic devices are described. The user session is conducted as an audible session via an audible interface provided by a primarily audible first electronic device. Input data is received from the audible interface, wherein the input data causes the audible interface to progress through audible interface states. A current audible interface state is mapped to a visual interface state defined for a visual interface. The mapped visual interface state is pushed to a second electronic device having a visual output device for displaying the visual interface, to enable the user session to be continued as a visual session on the second electronic device.

18 Claims, 9 Drawing Sheets

METHODS AND SYSTEMS FOR TRANSFERRING A SESSION BETWEEN AUDIBLE INTERFACE AND VISUAL INTERFACE

TECHNICAL FIELD

The present disclosure relates to audible interfaces, including interfaces for use with voice-based virtual assistants. In particular, the present disclosure relates to methods and systems for transferring a session between an audible interface and a visual interface.

BACKGROUND

Voice-based virtual assistants (also referred to simply as voice assistants) are software applications that use voice recognition to receive, interpret and execute audible commands (e.g., voice commands). Voice assistants may be provided by a mobile wireless communication device such as a smartphone, desktop or laptop computer, smart device (such as a smart speaker) or similar internet-of-things (IoT) device.

A drawback of voice assistants is that such systems may not be kept close to the user at all times. This may be particularly the case where the voice assistant is a primarily audible device that provides an audible interface (such as a smart speaker). Accordingly, an interactive session that the user conducts with the voice assistant cannot be continued when the user moves out of range of the voice assistant. It would be desirable to provide a solution that enables a session conducted with a voice assistant to be continued in such situations.

DESCRIPTION OF EXAMPLE EMBODIMENTS

Figure 1A:
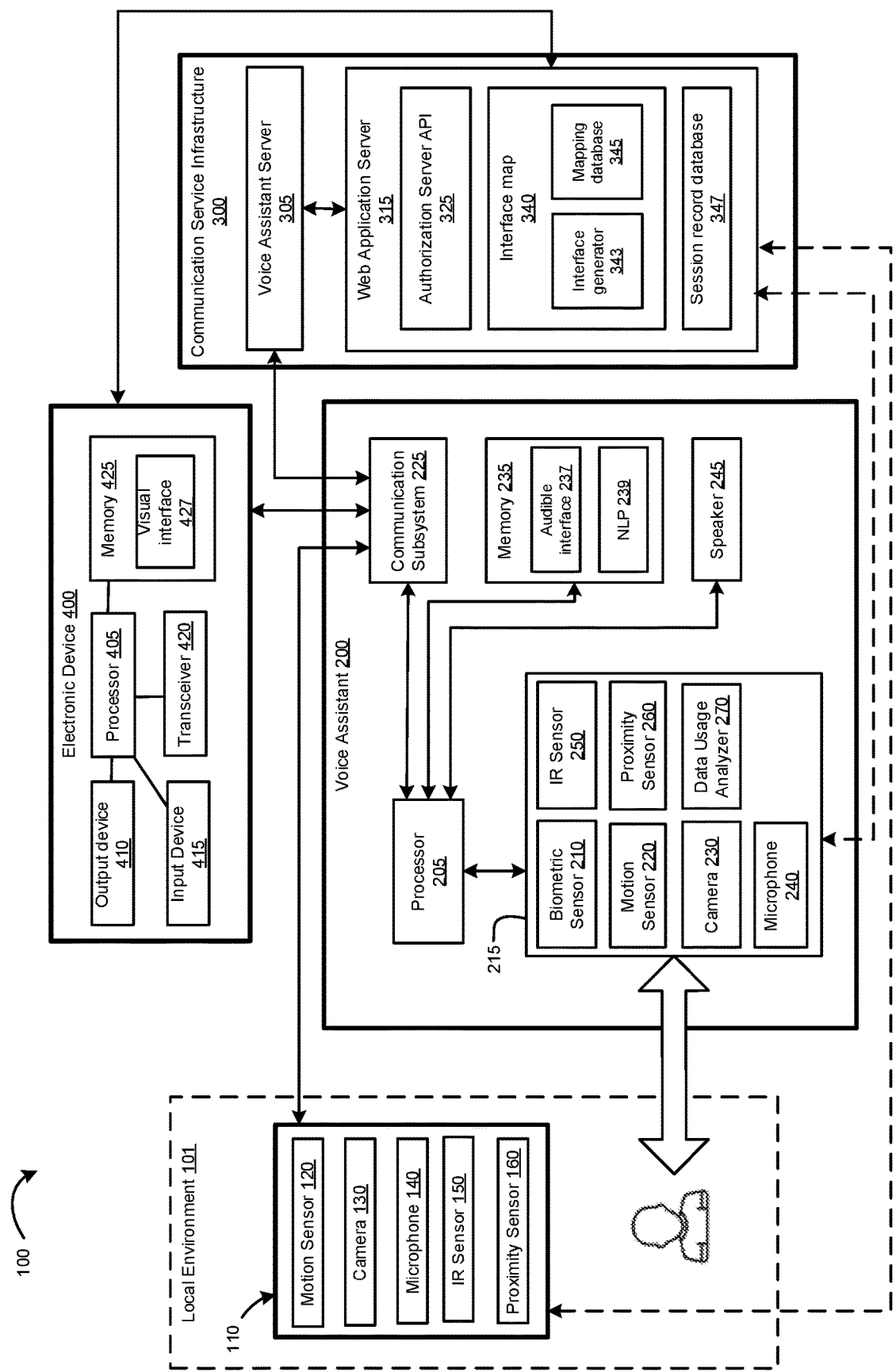
FIGS. 1A and 1B are schematic diagrams of a communication system in accordance with example embodiments of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium. Elements referred to in the singular may be implemented in the plural and vice versa, except where indicated otherwise either explicitly or inherently by context.

In accordance with one aspect of the present disclosure, there is provided a server, which may be a web application server. The server includes at least one communication interface for communication with a first primarily audible electronic device and a second electronic device having a visual output device. The server also includes a processor coupled to the communication interface. The server also includes a memory coupled to the processor, the memory having computer-executable instructions stored thereon. The instructions, when executed by the processor, cause the server to conduct a user session as an audible-only session via an audible interface provided by the first electronic device, a plurality of audible interface states being defined for the audible interface. The instructions also cause the server to receive a first signal from the first electronic device via the communication interface, the first signal including input data from the audible interface, wherein the input data causes the audible interface to progress through the audible interface states. The instructions also cause the server to map a current audible interface state to one of a plurality of visual interface states defined for a visual interface. The instructions also cause the server to generate and send a second signal via the communication interface to the second electronic device, the second signal including a pushed mapped visual interface state, to enable the user session to be continued as a visual session on the second electronic device.

In accordance with another aspect of the present disclosure, there is provided a method for transferring a user session between at least two electronic devices. The method includes conducting the user session as an audible session via an audible interface provided by a primarily audible first electronic device, a plurality of audible interface states being defined for the audible interface. The method also includes receiving input data from the audible interface, wherein the input data causes the audible interface to progress through the audible interface states. The method also includes mapping a current audible interface state to one of a plurality of visual interface states defined for a visual interface. The method also includes pushing the mapped visual interface state to a second electronic device having a visual output device for displaying the visual interface, to enable the user session to be continued as a visual session on the second electronic device.

In accordance with another aspect of the present disclosure, there is provided a voice assistant device. The voice assistant device includes an audio-only input device for receiving audible input. The voice assistant device also includes an audio-only output device for providing audible output. The voice assistant device also includes a communication interface for communication with a server. The voice assistant device also includes a processor coupled to the input device, the output device and the interface. The voice assistant device also includes a memory coupled to the processor, the memory having computer-executable instructions stored thereon. The instructions, when executed by the processor, cause the voice assistant device to conduct an audible-only session via an audible interface, a plurality of audible interface states being defined for the audible interface. The instructions also cause the voice assistant device to receive audible input, wherein the audible input causes the audible interface to progress through the audible interface states. The instructions also cause the voice assistant device to provide a first signal to the server via the communication interface, the first signal including input data indicative of a current audible interface state of the audible interface. The instructions also cause the voice assistant device to suspend the audible-only session. The instructions also cause the voice assistant device to receive a second signal from the server via the communication interface, the second signal including instructions to continue the audible-only session using a different audible interface state.

In any of the above, mapping the current audible interface state to the mapped visual interface state may include generating the mapped visual interface state.

In any of the above, the mapped visual interface state may be generated based on one or more contextual factors.

In any of the above, the current audible interface state may be saved; and the current audible interface state may be mapped to the mapped visual interface state after the saving.

In any of the above, the current audible interface state may be saved in response to detecting suspension of the visual session.

In any of the above, during the visual session, input data may be received from the visual interface. During the visual session, a current visual interface state may be mapped to one of the plurality of audible interface states. The mapped audible interface state may be pushed to the first electronic device, to enable the visual session to be continued as an audible session on the first electronic device.

In any of the above, prior to conducting the user session as an audible session, in response instructions to initiate the audible session on the first electronic device, the user may be authenticated. Authenticating may be performed by authenticating the second electronic device, sending a request to provide authentication data, and receiving the authentication data from the first or the second electronic device.

In any of the above, a plurality of audible interface states may be mappable to a single visual interface state, each of the plurality of audible interface states corresponding to completion of a respective input field of the single visual interface state. The mapped visual interface state pushed to the second electronic device may include one or more of the fields being completed according to the current audible interface state.

In any of the above, the pushed mapped visual interface state may include a deep link to the mapped visual interface state of the visual interface.

In any of the above, the mapped visual interface state may be pushed in response to: detecting the second electronic device has moved outside a vicinity of the first electronic device; or detecting user input on the second electronic device.

In any of the above, the mapping may be performed in response to the detecting.

In any of the above, the mapping may be performed in response to receiving input data indicating instructions to continue the audible session as the visual session.

In any of the above, during the visual session, input data may be received from the visual interface. The user session may be ended by ending the visual session.

In accordance with further aspects of the present disclosure, there is provided a non-transitory machine readable medium having tangibly stored thereon executable instructions for execution by a processor, such as a processor of a server that is in network communication with a voice assistant device, or a processor of a voice assistant device. The executable instructions, when executed by the processor, cause the server or the voice assistant device to perform one or more of the methods described above and herein.

Reference is first made to FIG. 1A which shows in schematic block diagram form a communication system 100 in accordance with one example embodiment of the present disclosure. The communication system 100 includes a voice assistant device 200, one or more sensors 110 located in a local environment 101 in the vicinity of the voice assistant device 200, one or more other electronic devices 400, and a communication service infrastructure 300. The voice assistant device 200 is an electronic device that may be a wireless communication device such as a smartphone, desktop or laptop computer, smart device (such as a smart speaker) or similar IoT device. The voice assistant device 200 may function as a voice-based virtual assistant (also referred to simply as a voice assistant). In various embodiments described herein, the voice assistant device 200 may be a primarily audible device, which receives audio input (e.g., voice commands from a user) and outputs audio output (e.g., from a speaker) and which does not make use of a visual interface. In various embodiments described herein, the voice assistant device 200 may be designed to be placed in the local environment 101, and may be not be intended to be carried with the user.

The one or more sensors 110 may include a motion sensor 120, a camera 130, a microphone 140, an infrared (IR) sensor 150, and/or a proximity sensor 160, and/or combinations thereof. The one or more sensors 110 are communicatively coupled to the voice assistant device 200 via wireless and/or wired connections. The one or more sensors 110 sense a coverage area within the local environment 101. The one or more sensors 110 may be spaced around the local environment 101 to increase the coverage area. The local environment 101 may be a room, a number of rooms, a house, apartment, condo, hotel or other similar location.

The voice assistant device 200 communicates with the electronic device 400 via a communication network (not shown) such as the Internet. The voice assistant device 200 also communicates with the communication service infrastructure 300 via the communication network. In some examples, the electronic device 400 may also communicate with the communication service infrastructure 300 via the communication network. Different components of the communication system 100 may communicate with each other via different channels of the communication network, in some examples.

The communication network enables exchange of data between the voice assistant device 200, the communication service infrastructure 300 and the electronic device 400. The communication network may comprise a plurality of networks of one or more network types coupled via appropriate methods known in the art, comprising a local area network (LAN), such as a wireless local area network (WLAN) such as Wi-Fi™, a wireless personal area network (WPAN), such as Bluetooth™ based WPAN, a wide area network (WAN), a public-switched telephone network (PSTN), or a public-land mobile network (PLMN), also referred to as a wireless wide area network (WWAN) or a cellular network. The WLAN may include a wireless network which conforms to IEEE 802.11x standards or other communication protocol.

The voice assistant device 200 is equipped for one or both of wired and wireless communication. The voice assistant device 200 may be equipped for communicating over LAN, WLAN, Bluetooth, WAN, PSTN, PLMN, or any combination thereof. The voice assistant device 200 may communicate securely with other devices and systems using, for example, Transport Layer Security (TLS) or its predecessor Secure Sockets Layer (SSL). TLS and SSL are cryptographic protocols which provide communication security over the Internet. TLS and SSL encrypt network connections above the transport layer using symmetric cryptography for privacy and a keyed message authentication code for message reliability. When users secure communication using TSL or SSL, cryptographic keys for such communication are typically stored in a persistent memory of the voice assistant device 200.

The voice assistant device 200 includes a controller comprising at least one processor 205 (such as a microprocessor) which controls the overall operation of the voice assistant device 200. The processor 205 is coupled to a plurality of components via a communication bus (not shown) which provides a communication path between the components and the processor 205.

In this example, the voice assistant device 200 includes a number of sensors 215 coupled to the processor 205. The sensors 215 may include a biometric sensor 210, a motion sensor 220, a camera 230, a microphone 240, an infrared (IR) sensor 250 and/or a proximity sensor 260. A data usage monitor and analyzer 270 may be used to automatically capture data usage, and may also be considered to be a sensor 215. The sensors 215 may include other sensors (not shown) such as a satellite receiver for receiving satellite signals from a satellite network, orientation sensor, electronic compass or altimeter, among possible examples.

The processor 205 is coupled to one or more memories 235 which may include Random Access Memory (RAM), Read Only Memory (ROM), and persistent (non-volatile) memory such as flash memory, and a communication subsystem 225 for communication with the communication service infrastructure 300. The communication subsystem 225 includes one or more wireless transceivers for exchanging radio frequency signals with wireless networks of the communication system 100. The communication subsystem 225 may also include a wireline transceiver for wireline communications with wired networks.

The wireless transceivers may include one or a combination of Bluetooth transceiver or other short-range wireless transceiver, a Wi-Fi or other WLAN transceiver for communicating with a WLAN via a WLAN access point (AP), or a cellular transceiver for communicating with a radio access network (e.g., cellular network). The cellular transceiver may communicate with any one of a plurality of fixed transceiver base stations of the cellular network within its geographic coverage area. The wireless transceivers may include a multi-band cellular transceiver that supports multiple radio frequency bands. Other types of short-range wireless communication include near field communication (NFC), IEEE 802.15.3a (also referred to as UltraWideband (UWB)), Z-Wave, ZigBee, ANT/ANT+ or infrared (e.g., Infrared Data Association (IrDA) communication). The wireless transceivers may include a satellite receiver for receiving satellite signals from a satellite network that includes a plurality of satellites which are part of a global or regional satellite navigation system.

The voice assistant device 200 includes one or more output devices, including a speaker 245 for providing audio output. The one or more output devices may also include a display (not shown). In some examples, the display may be part of a touchscreen. The touchscreen may include the display, which may be a color liquid crystal display (LCD), light-emitting diode (LED) display or active-matrix organic light-emitting diode (AMOLED) display, with a touch-sensitive input surface or overlay connected to an electronic controller. In some examples, the voice assistant device 200 may be a primarily audible device (e.g., where the voice assistant device 200 is a smart speaker), having only or primarily audio output devices such as the speaker 245. The voice assistant device 200 may also include one or more auxiliary output devices (not shown) such as a vibrator or light-emitting diode (LED) notification light, depending on the type of voice assistant device 200. It should be noted that even where the voice assistant device 200 is a primarily audible device, an auxiliary output device may still be present (e.g., an LED to indicate power is on).

The voice assistant device 200 includes one or more input devices, including a microphone 240 for receiving audio input (e.g., voice input). The one or more input devices may also include one or more additional input devices (not shown) such as buttons, switches, dials, a keyboard or keypad, or navigation tool, depending on the type of voice assistant device 200. In some examples, the voice assistant device 200 may be a primarily audible device (e.g., where the voice assistant device 200 is a smart speaker), having only or primarily audio input devices such as the microphone 240. The voice assistant device 200 may also include one or more auxiliary input devices (not shown) such as a button, depending on the type of voice assistant device 200. It should be noted that even where the voice assistant device 200 is a primarily audible device, an auxiliary input device may still be present (e.g., a power on/off button).

The voice assistant device 200 may also include a data port (not shown) such as serial data port (e.g., Universal Serial Bus (USB) data port).

In the voice assistant device 200, operating system software executable by the processor 205 is stored in the persistent memory of the memory 235 along with one or more applications, including a voice assistant application. The voice assistant application comprises instructions for implementing an audible interface 237 (e.g., a voice user interface (VUI)), to enable a user to interact with and provide instructions to the voice assistant device 200 via audible (e.g., voice) input. The memory 235 may also include a natural language processing (NLP) function 239, to enable audible input to be analyzed into commands, input and/or intents, for example. Other applications such as mapping, navigation, media player, telephone and messaging applications, etc. may also be stored in the memory. The voice assistant application, when executed by the processor 205, allows the voice assistant device 200 to perform at least some embodiments of the methods described herein. The memory 235 stores a variety of data, including sensor data acquired by the sensors 215; user data including user preferences, settings and possibly biometric data about the user for authentication and/or identification; a download cache including data downloaded via the wireless transceivers; and saved files. System software, software modules, specific device applications, or parts thereof, may be temporarily loaded into RAM. Communication signals received by the voice assistant device 200 may also be stored in RAM. Although specific functions are described for various types of memory, this is merely one example, and a different assignment of functions to types of memory may be used in other embodiments.

The communication service infrastructure 300 includes a voice assistant server 305 and a web application server 315. The voice assistant server 305 and the web application server 315 each includes a communication interface (not shown) to enable communications with other components of the communication system 100. The web application server 315 provides an authorization server application programming interface (API) 325 and an interface map function 340, among other APIs and functions. The web application server 315 may provide services and functions for the voice assistant device 200. For example, the web application server 315 may include the interface map function 340, which may enable a visual user interface (e.g., a graphical user interface (GUI)) to be mapped to an audible user interface (e.g., a voice user interface (VUI)) and vice versa, as discussed further below. The interface map function 340 may include sub-modules or sub-functions, such as an interface generator 343 and a mapping database 345. The web application server 315 may also include a session record database 347, in which a state of an ongoing user session may be saved, as discussed further below. The voice assistant server 305 and the web application server 315 may be operated by different entities, introducing an additional security in allowing the voice assistant server 305 to assess data of the web application server 315, particularly private data such as banking information. In other embodiments, the voice assistant server 305 may be a server module of the web application server 315 rather than a distinct server. Each of the web application server 315 and voice assistant server 305 may be implemented by a single computer system that may include one or more server modules.

The voice assistant application (e.g., stored in the memory 235 of the voice assistant device 200) may be a client-side component of a client-server application that communicates with a server-side component of the voice assistant server 305. Alternatively, the voice assistant application may be a client application that interfaces with one or more APIs of the web application server 315 or IoT device manager 350. One or more functions/modules described as being implemented by the voice assistant device 200 may be implemented or provided by the voice assistant server 305 or the web application server 315. For example, the NLP function 239 may be implemented in the voice assistant server 305 instead of the voice assistant device 200. In another example, the audible interface function 237 may not be implemented in the voice assistant device 200. Instead, the web application server 315 or voice assistant server 305 may store instructions for implementing an audible interface.

The electronic device 400 in this example includes a controller including at least one processor 405 (such as a microprocessor) which controls the overall operation of the electronic device 400. The processor 405 is coupled to a plurality of components via a communication bus (not shown) which provides a communication path between the components and the processor 405.

Examples of the electronic device 400 include, but are not limited to, handheld or mobile wireless communication devices, such as smartphones, tablets, laptop or notebook computers, netbook or ultrabook computers; as well as vehicles having an embedded-wireless communication system, such as a Wi-Fi or cellular equipped in-dash infotainment system, or tethered to another wireless communication device having such capabilities. Mobile wireless communication devices may include devices equipped for cellular communication through PLMN or PSTN, mobile devices equipped for Wi-Fi communication over WLAN or WAN, or dual-mode devices capable of both cellular and Wi-Fi communication. In addition to cellular and Wi-Fi communication, a mobile wireless communication device may also be equipped for Bluetooth and/or NFC communication. In various embodiments, the mobile wireless communication device may be configured to operate in compliance with any one or a combination of a number of wireless protocols, including Global System for Mobile communications (GSM), General Packet Radio Service (GPRS), code-division multiple access (CDMA), Enhanced Data GSM Environment (EDGE), Universal Mobile Telecommunications System (UMTS), Evolution-Data Optimized (EvDO), High Speed Packet Access (HSPA), 3rd Generation Partnership Project (3GPP), or a variety of others. It will be appreciated that the mobile wireless communication device may roam within and across PLMNs. In some instances, the mobile wireless communication device may be configured to facilitate roaming between PLMNs and WLANs or WANs.

The electronic device 400 includes one or more output devices 410 coupled to the processor 405. The one or more output devices 410 may include, for example, a speaker and a display (e.g., a touchscreen). Generally, the output device (s) 410 of the electronic device 400 is capable of providing visual output and/or other types of non-audible output (e.g., tactile or haptic output). The electronic device 400 may also include one or more additional input devices 415 coupled to the processor 405. The one or more input devices 415 may include, for example, buttons, switches, dials, a keyboard or keypad, or navigation tool, depending on the type of electronic device 400. In some examples, an output device 410 (e.g., a touchscreen) may also serve as an input device 415. A visual interface, such as a GUI, may be rendered and displayed on the touchscreen by the processor 405. A user may interact with the GUI using the touchscreen and optionally other input devices (e.g., buttons, dials) to display relevant information, such as banking or other financial information, etc. Generally, the electronic device 400 may be configured to process primarily non-audible input and to provide primarily non-audible output.

The electronic device 400 may also include one or more auxiliary output devices (not shown) such as a vibrator or LED notification light, depending on the type of electronic device 400. The electronic device 400 may also include a data port (not shown) such as a serial data port (e.g., USB data port).

The electronic device 400 may also include one or more sensors (not shown) coupled to the processor 405. The sensors may include a biometric sensor, a motion sensor, a camera, an IR sensor, a proximity sensor, a data usage analyser, and possibly other sensors such as a satellite receiver for receiving satellite signals from a satellite network, orientation sensor, electronic compass or altimeter.

The processor 405 is coupled to one or more wireless transceivers 420 for exchanging radio frequency signals with a wireless network that is part of the communication network. The processor 405 is also coupled to a memory 425, such as RAM, ROM or persistent (non-volatile) memory such as flash memory. In some examples, the electronic device 400 may also include a satellite receiver (not shown) for receiving satellite signals from a satellite network that comprises a plurality of satellites which are part of a global or regional satellite navigation system.

The one or more transceivers 420 may include one or a combination of Bluetooth transceiver or other short-range wireless transceiver, a Wi-Fi or other WLAN transceiver for communicating with a WLAN via a WLAN access point (AP), or a cellular transceiver for communicating with a radio access network (e.g., cellular network).

Operating system software executable by the processor 405 is stored in the memory 425. A number of applications executable by the processor 405 may also be stored in the memory 425. For example, the memory 425 may store instructions for implementing a visual interface 427 (e.g., a GUI). The memory 425 also may store a variety of data. The data may include sensor data sensed by the sensors; user data including user preferences, settings and possibly biometric data about the user for authentication and/or identification; a download cache including data downloaded via the transceiver(s) 420; and saved files. System software, software modules, specific device applications, or parts thereof, may be temporarily loaded into a volatile store, such as RAM, which is used for storing runtime data variables and other types of data or information. Communication signals received by the electronic device 400 may also be stored in RAM. Although specific functions are described for various types of memory, this is merely one example, and a different assignment of functions to types of memory may be used in other embodiments.

The electronic device 400 may also include a power source (not shown), for example a battery such as one or more rechargeable batteries that may be charged, for example, through charging circuitry coupled to a battery interface such as a serial data port. The power source provides electrical power to at least some of the components of the electronic device 400, and a battery interface may provide a mechanical and/or electrical connection for the battery.

One or more functions/modules described as being implemented by the electronic device 400 may be implemented or provided by the web application server 315. For example, the visual interface function 427 may not be implemented in the electronic device 400. Instead, the web application server 315 may store instructions for implementing a visual interface.

The above-described communication system 100 is provided for the purpose of illustration only. The above-described communication system 100 includes one possible communication network configuration of a multitude of possible configurations. Suitable variations of the communication system 100 will be understood to a person of skill in the art and are intended to fall within the scope of the present disclosure. For example, the communication service infrastructure 300 may include additional or different elements in other embodiments. In some embodiments, the system includes multiple components distributed among a plurality of computing devices. One or more components may be in the form of machine-executable instructions embodied in a machine-readable medium.

Data from the electronic device 400 and/or the sensor(s) 110 may be received by the voice assistant device 200 (e.g., via the communication subsystem 225) for processing, or for forwarding to a remote server, such as the web application server 315 (optionally via the voice assistant server 305), for processing. Data may also be communicated directly between the electronic device 400 and the web application server 315 (e.g., to enable session transfer as discussed further below).

In some examples, sensor data may be communicated directly (indicated by dashed arrows) from the sensor(s) 110 to the remote server (e.g. the web application server 315), for example wirelessly via Wi-Fi, without being handled through the voice assistance device 200. Similarly, the sensors 215 of the voice assistant device 200 may communicate directly (indicated by dashed arrow) with the remote server, (e.g. the web application server 315), for example wirelessly via Wi-Fi, without being handled through the voice assistance server 305. The voice assistant device 200 may still communicate with the voice assistance server 305 for the communications session, but sensor data may be communicated directly to the web application server 315 via a separate data channel.

Figure 1B:
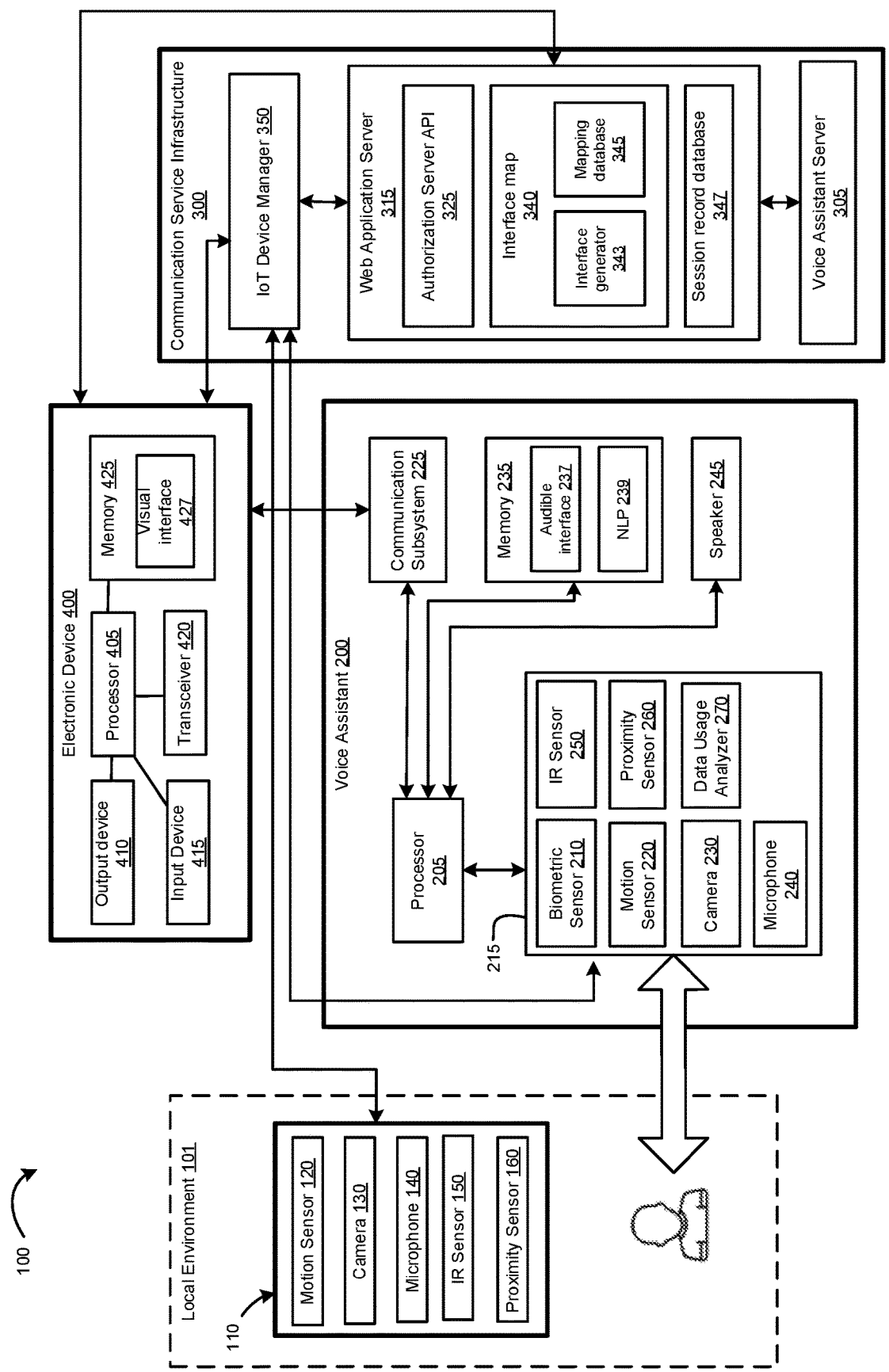

FIG. 1B shows another example embodiment of the communication system 100. The communication system 100 shown in FIG. 1B is similar to the communication system 100 shown in FIG. 1A, with differences as discussed below.

In FIG. 1B, the one or more sensors 110 in the local environment 101, the sensors 215 of the voice assistant device 200 and the connected electronic device 400 communicate with an IoT device manager 350 that is part of the communication service infrastructure 300. The IoT device manager 350 is connected to the web application server 315, and forwards the acquired sensor data to the web application server 315 for processing. In the embodiment of FIG. 1B, the voice assistant device 200 may still communicate with the voice assistance server 305 for the communications session, but sensor data may be communicated to the web application server 315 via a separate data channel. Similarly, the electronic device 400 may still communicate with the voice assistant device 200, but sensor data from the electronic device 400 may be communicated to the web application server 315 via the IoT device manager 350. Communication of other data (e.g., other non-sensor data) may be communicated as described above with reference to FIG. 1A.

Figure 2A:
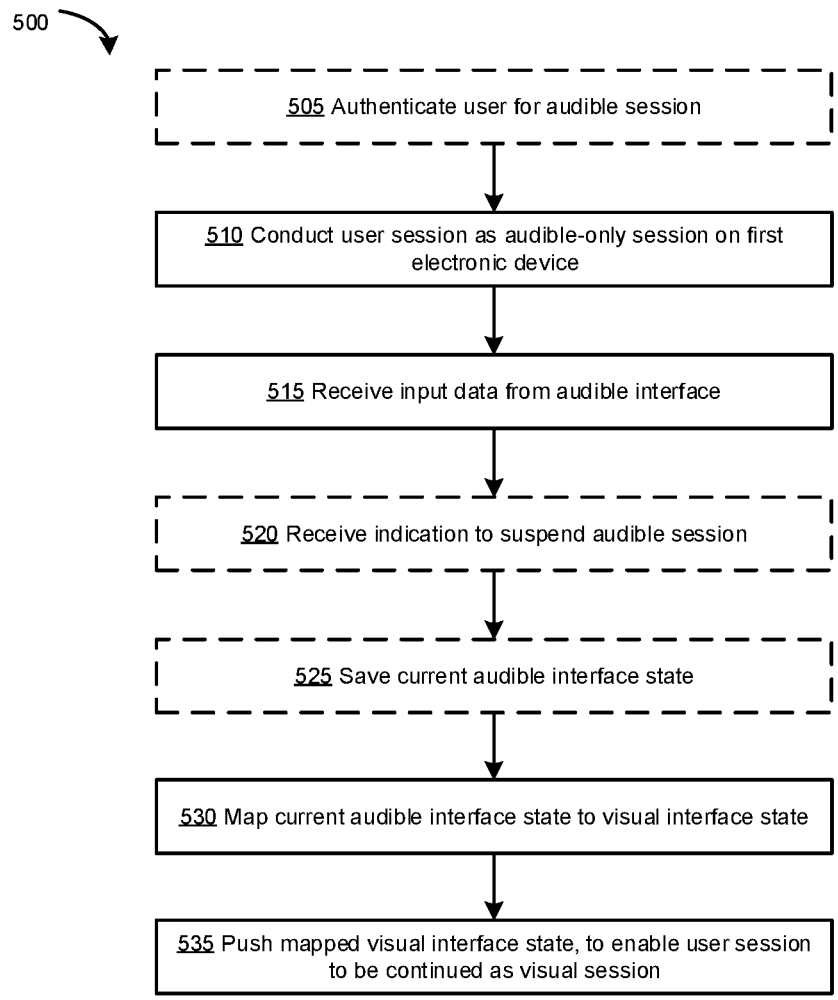
FIG. 2A is a flowchart illustrating an example method for transferring a session from an audible interface to a visual interface in accordance with an example embodiment of the present disclosure.

Reference is now made to FIG. 2A, illustrating an example method 500 for transferring a user session between at least two electronic devices, in accordance with one example embodiment of the present disclosure. In some examples, the example method 500 may be performed by the web application server 315.

The method 500 may involve transferring a user session that is an audible session, conducted using the voice assistant device 200, to a visual session, which may be conducted using another electronic device 400. The visual session may optionally be transferred back to an audible session. Notably, the transfer from an audible session to a visual session occurs between a primarily audible device, such as the voice assistant device 200, and a different device that has a visual output device, such as the electronic device 400. Further, the session transfer involves not only transferring the session state between devices, but also involves mapping between an audible interface and a visual interface.

As will be appreciated in light of the present disclosure, transferring a user session between an audible interface on a voice assistant device 200 and a visual interface on an electronic device 400 that provides visual output presents unique challenges. For example, the way a user interacts with an audible interface (e.g., using serial inputs/outputs) may be fundamentally different from the way a user interacts with a visual interface (e.g., capable of parallel inputs, capable of parallel outputs, or providing inputs and outputs at the same time). A backend server, such as the web application server 315, may be required to coordinate data between audible and visual interfaces (e.g., by mapping interface states), and to communicate data between the voice assistant device 200 and the electronic device 400 in a seamless and real-time manner. It will be appreciated that a seamless transition from an audible interface to a visual interface (or vice versa) is desirable to provide a positive user experience.

At 505, optionally, the user is authenticated prior to conducting the audible session. Authentication may be required, for example, when a user makes a request (e.g., via audible input such as a voice command) to initiate a new session as an audible session with the voice assistant device 200. Authentication may also be required, for example, when an ongoing non-audible session is to be transferred to an audible session. An example of an authentication method will be discussed further below with respect to FIG. 3.

At 510, a user session is conducted as an audible session on a first electronic device. The first electronic device is a primarily audible device, such as the voice assistant device 200, which provides an audible interface for conducting the audible session. The audible interface may be an interface for a web application, such as a banking session of a banking application of a financial institution. For example, a user may use the audible interface during the audible session to perform banking transactions (e.g., transfer funds), to obtain information from the financial institution (e.g., ask about mortgage rates) or to apply for a bank account, among other possibilities.

At 515, input data is received from the audible interface. The user may interact with the audible interface using audible input (e.g., voice input) that is received by the microphone 240 of the voice assistant device 200. The processor 205 of the voice assistant device 200 receives and interprets the voice input (e.g., using NLP function 239). Interpreting the voice input by the voice assistant device 200 may include, for example, performing voice recognition to identify one or more words in the voice sample, matching the one or more words to a command, instruction or intent, and optionally one or more parameters relevant to the command, instruction or intent.

The input data may be provided by the voice assistant device 200 to the voice assistant server 305 via the communication subsystem 225 (e.g., via a wireless transceiver). The voice assistant server 305 forwards the API call to the web application server 315 providing the web application and its communication service, such as the banking session for the banking application of the financial instruction. Alternatively, in other embodiments the API call is sent by the voice assistant device 200 directly to the web application server 315 without a voice assistant server 305. The web application server 315 may then process the input data, for example to determine an appropriate response to provide via the audible interface, or to determine whether the audible interface should progress to a next audible interface state.

The received input may enable the audible interface to progress through a plurality of audible interface states. Generally, each audible interface has defined a plurality of audible interface states, each state defining an audible output to be provided to the user or an audible input to be requested from the user. An audible interface state may include information relevant to the context of the audible session, such as information provided by the user and/or any previous states. Because audible information is typically provided in a serial manner, each valid audible input provided to the audible interface may be expected to progress the audible interface to the next audible interface state.

At 520, optionally, an indication may be received indicating that the audible session is to be suspended. This may include, for example, an explicit voice command from the user to suspend the audible session (e.g., "pause my session") or to transfer the audible session to another device (e.g., "move to my phone"). The indication may also be implicit. For example, if the web application server 315 receives data input from a second electronic device (e.g., the electronic device 400) associated with the user, this may indicate that the user wishes to continue the session using the second electronic device instead of the first electronic device (e.g., the voice assistant device 200). In another example, the IoT device manager 350 may detect sensor data from the second electronic device (e.g., a user has connected the second electronic device to a vehicle, or the location of the second electronic device (e.g., as indicated by a location sensor) has moved), which may indicate that the user has left the local environment 101 in which the voice assistant device 200 is located. In some examples, the IoT device manager 350 may implement a location detection module that receives location data (e.g., GPS data, beacon data, radiofrequency ID data, Bluetooth data, IP address data or MAC address data, among other possibilities) from respective sensors on the voice assistant device 200 and the electronic device 400, and determine whether the electronic device 400 has moved outside a predefined radius of the voice assistant device 200.

In some examples, the audible session may be suspended in response to other triggers, such as a prolonged time period without any audible user input, or loss of connection between the voice assistant device 200 and the voice assistant server 305 (e.g., due to loss of wireless communication link or the voice assistant device 200 being powered off). In some examples, suspension of the audible session may be a security feature.

At 525, optionally, the current audible interface state may be saved by the web application server 315. For example, the current audible interface state may be saved into the session record database 347. The saved interface state may include information about the context of the audible session, such as information that has been received from the user and/or information that has been provided to the user (e.g., a current product page or completed input fields in an application). The current audible interface state may be saved when the audible session is suspended at 520, for example. The current audible interface state may also be saved at regular intervals, or after each valid voice input, among other possibilities. Saving the current audible interface state may enable a suspended audible session to be resumed (whether as an audible session or as a visual session) at a later time (e.g., an hour later or a week later), at the same state.

At 530, the current audible interface state (which may have been saved at 525) is mapped to one of a plurality of visual interface states defined for a visual interface. This mapping may be performed by the web application server 315, using the interface map function 340, for example. Where the current audible interface state has been saved at 525, the saved audible interface state may be retrieved (e.g., from the session record database 347) and used to perform the mapping.

In some examples, performing the mapping may include generating the mapped visual interface state. In such examples, the interface map function 340 may implement the interface generator 343. Generation of the mapped visual interface state may, for example, take into account one or more contextual factors. A contextual factor may include, for example, device factors (e.g., the type of display provided by the second electronic device), accessibility factors (e.g., whether the visual interface should be modified or augmented, such as by providing larger font or providing haptic output), or aesthetic factors (e.g., user preference to display images). The web application server 315 may query the session record database 347, a user profile database or may query the second electronic device, for example, to determine such contextual factor(s) for generating the mapped visual interface state. For example, the web application server 315 may detect that the second electronic device has a small display and therefore the mapped visual interface state may be generated to avoid the use of tables or charts.

The interface map function 340 may implement a set of rules, for example, that govern how the current audible interface state should be mapped to a visual interface state. In some examples, the mapping may be performed using a pre-defined audible-visual interface map (which may be pre-programmed as part of the web application), which defines the relationship between different audible interface states and the corresponding visual interface states. The set of rules and/or the pre-defined audible-visual interface map may be stored in the mapping database 345 (e.g., internal to the interface map function 340), for example, which may be referenced by the interface map function 340. In some examples, where a corresponding visual interface has not been defined (e.g., where the web application has been designed to be primarily accessed via the audible interface), the interface map function 340 may generate the visual interface (e.g., using the interface generator 343) by, for example, converting audible output to textual output.

In some examples, the interface map function 340 may query one or more other databases to access additional information required to perform the mapping. This may be the case where the current visual interface state or the saved visual interface state does not provide sufficient information to generate the mapped visual interface state. For example, where the audible session involved completing an application form, the saved visual interface state may include user inputs for certain fields of the application form, but may not include a visual representation of the application form itself. The interface map function 340 may instead query another database (which may be internal to the web application server 315 or may be an external database) to obtain information for providing a visual representation of the application form in the mapped visual interface state.

Each audible interface may correspond to a visual interface, such that any user interaction that may be performed using a primarily audible first electronic device (e.g., the voice assistant device 200) may also be performed using a second electronic device providing a visual output (e.g., the electronic device 400), and vice versa. However, there is not necessarily a one-to-one mapping between audible interface states and visual interface states. For example, because audible interactions tend to take place using serial audio inputs/outputs, two or more audible interface states may map to one visual interface state.

Figure 5:
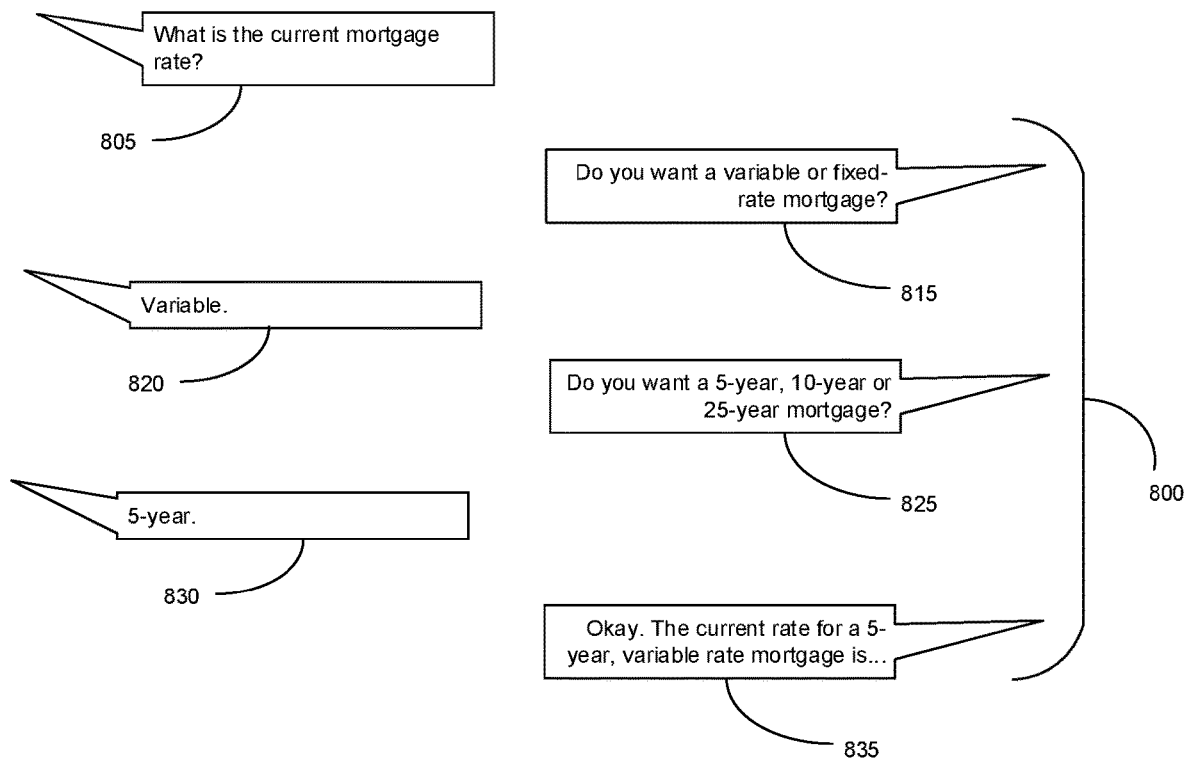
FIG. 5 illustrates an example of an audible interface in accordance with an example embodiment of the present disclosure.

FIG. 5 illustrates an example of an audible interface 800 with multiple audible interface states that may map onto a single visual interface state. The audible interface 800 may be initiated with an audible input 805 requesting a mortgage rate, for example. The audible interface 800 may begin at a first state 815 to request user input to select a type of rate. The user provides an audible input 820 to select a variable rate. The audible interface 800 then proceeds to the second state 825 to request user input to select an amortization period. The user provides an audible input 830 to select a 5-year amortization period. The audible interface 800 then proceeds to the final state 835 to provide audible output informing the user of the current mortgage rate according to the user's selected parameters.

Each audible input 805, 820, 830 may be parsed to determine an intent (e.g., using the NLP function 239 of the voice assistant device 200) and provided as input data to the web application server 315. The web application server 315 may process the input data and determine the next audible interface state 815, 825, 835 of the audible interface 800. The web application server 315 may provide instructions to the voice assistant device 200 to enable the audible interface function 237 to provide the appropriate audible interface state 815, 825, 835. Alternatively, the web application server 315 or voice assistant server 305 may store instructions for implementing the audible interface, and the voice assistant device 200 may be provided instructions to simply generate the appropriate audible output.

Figure 6:
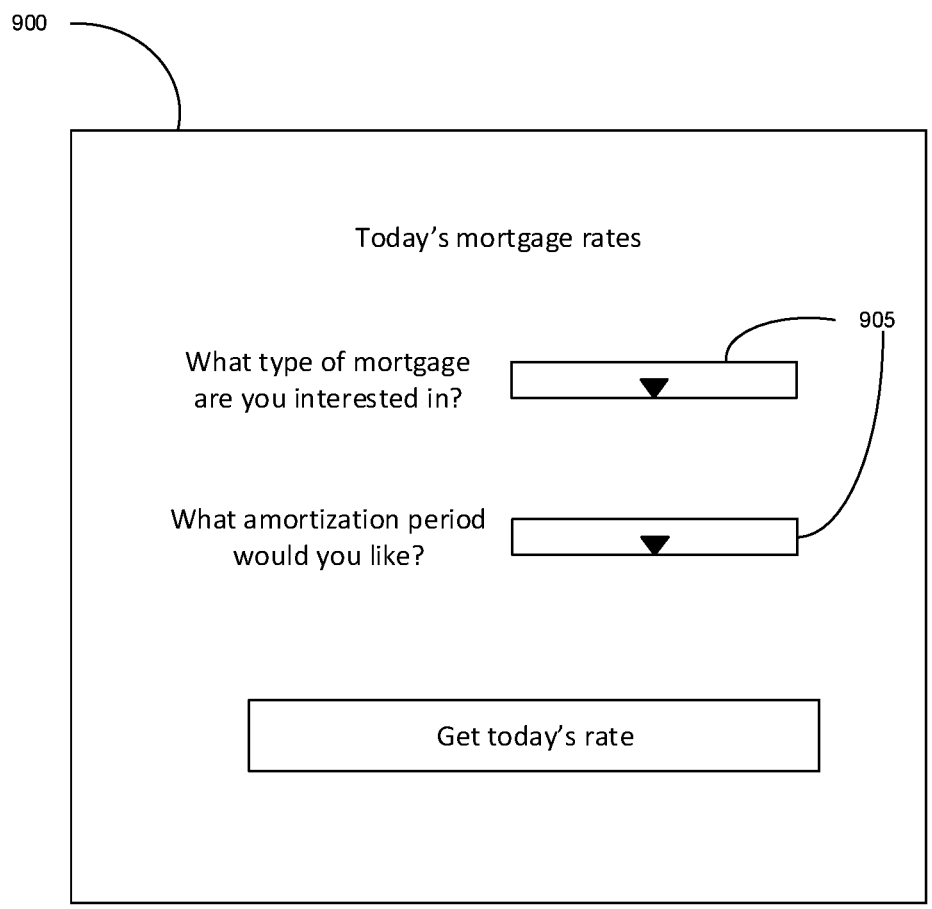
FIG. 6 illustrates an example of a visual interface in accordance with an example embodiment of the present disclosure.

FIG. 6 illustrates an example visual interface 900 that may correspond to the audible interface 800 of FIG. 5. Instead of multiple audible interface states 815, 825, 835, the visual interface 900 may have a single visual interface state, with multiple input fields 905 (e.g., drop-down menus). Each input field 905 may correspond to a different audible interface state 815, 825. Thus, in a visual interface 900, the inputs/outputs that are provided serially when in an audible format may be provided in parallel when in a visual format. The user may provide input to the visual interface 900 in any order, rather than the serial order defined in the audible interface 800. A visual interface may similarly provide outputs in parallel, for example providing information about two different interest rates in a single table, rather than in a serial manner.

Thus, a plurality of audible interface states in an audible interface may be mapped to a single visual interface state in a visual interface. For example, each audible interface state may correspond to a completion of a respective input field in the single visual interface state.

Figure 7:
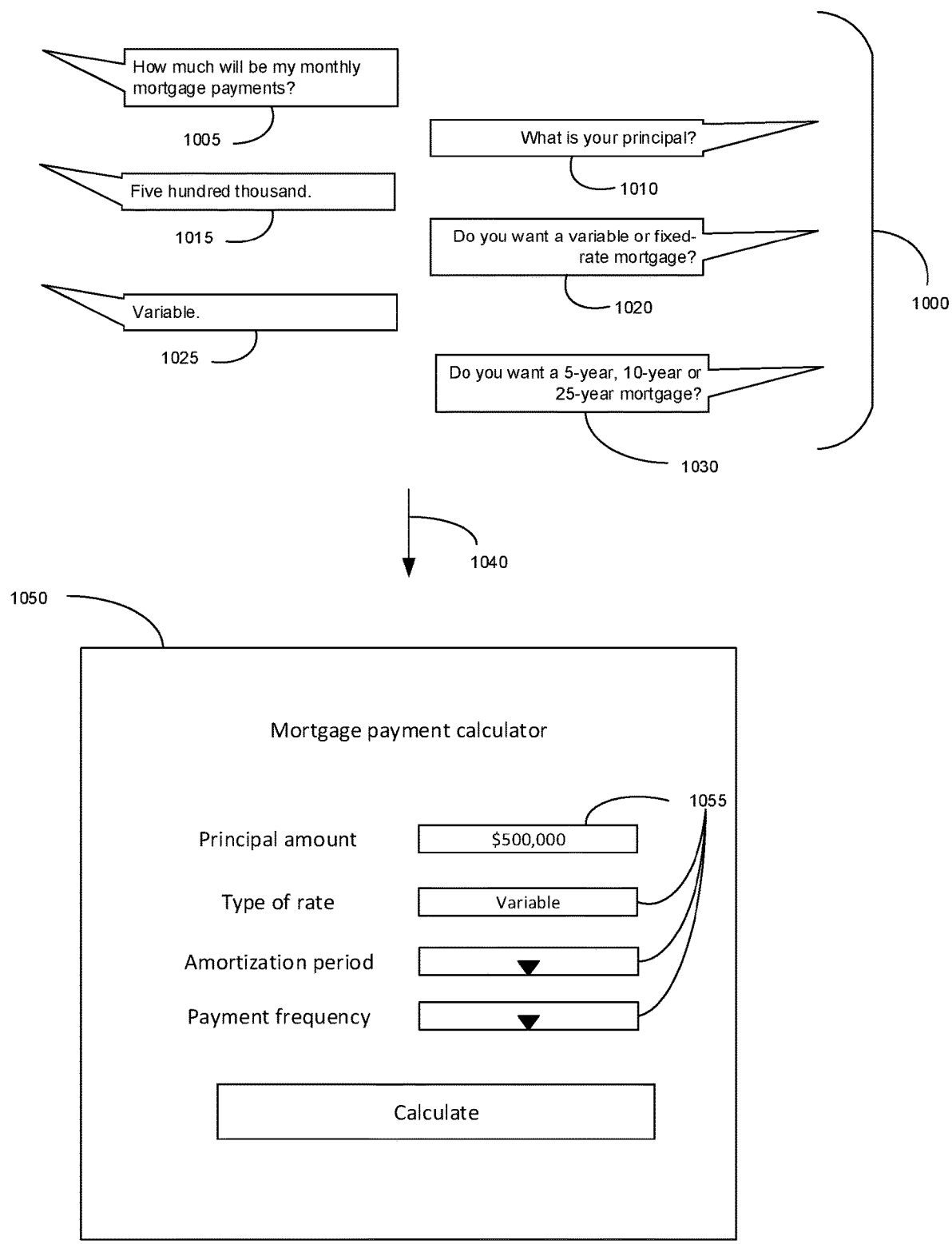
FIG. 7 illustrates an example of how an audible interface may be mapped to a visual interface in accordance with an example embodiment of the present disclosure.

FIG. 7 illustrates an example in which different audible interface states correspond to completion of a respective input field in a single visual interface state. In FIG. 7, a series of audible inputs 1005, 1015, 1025 progresses the audible interface 1000 through a series of audible interface states 1010, 1020, 1030. The audible interface 1000 may be mapped 1040 to a single visual interface state 1050 (e.g., as described herein). Notably, the visual interface state 1050 includes a plurality of input fields 1055. Certain audible interface states 1010, 1020, 1030 may be audible outputs requesting user input, corresponding to respective input fields. Certain audible inputs 1015, 1025 may correspond to completion of the respective input fields. Accordingly, when the audible interface state 1030 is mapped 1040 to the visual interface state 1050, the visual interface state 1050 may include the corresponding input fields 1055 (e.g., "principal amount" and "type of rate") already completed according to the audible inputs 1015, 1025 that were provided during the audible session. In this way, the audible session may be transferred and continued as the visual session without loss of information, thus providing a more seamless user experience.

FIGS. 5-7 illustrate example interfaces for a web application relating to a mortgage. Other interfaces may be provided for responding to other types of user requests including, for example, a request for information regarding a product, filling an application, a request to transfer funds, or an inquiry about a user's transactions, among other possibilities.

Reference is again made to FIG. 2A. After the current audible interface state has been mapped to a visual interface state, at 535 the mapped visual interface state is pushed to the second electronic device, to enable the user session to be continued as a visual session. In some examples, the mapped visual interface state may be pushed as a deep link (which may be also generated by the interface map function 340), which may link to a page of the web application corresponding to the mapped visual interface state. The deep link may be used by the second electronic device to automatically provide the mapped visual interface state, when the user accesses the web application on the second electronic device. The deep link may also be provided to the user (e.g., in an email or other notification), and the mapped visual interface state may be provided when the user selects the deep link.

It should be noted that the mapped visual interface state may be pushed to the second electronic device in the background, without the user being aware. For example, the web application server 315 may push data to the second electronic device to enable the second electronic device to generate the mapped visual interface state, however this pushed data may be stored by the second electronic device. The stored data may be later used to generate the visual interface state on the display of the second electronic device, for example in response to user input to access the web application using the second electronic device.

The user session may be continued as a visual session, and may end using the visual interface. In other examples, the user session may be transferred back to an audible session on the voice assistant device 200.

Figure 2B:
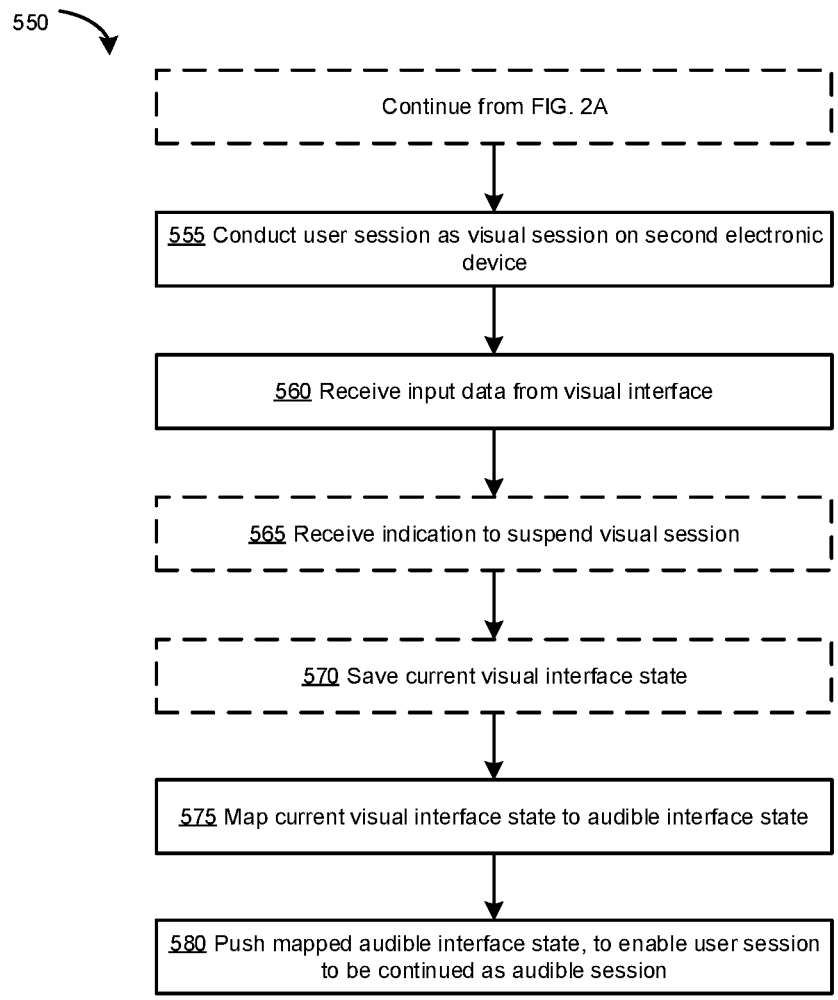
FIG. 2B is a flowchart illustrating an example method for transferring a session from a visual interface to an audible interface in accordance with an example embodiment of the present disclosure.

FIG. 2B illustrates an example method 550 for transferring a user session that is a visual session, conducted using the electronic device 400, to an audible session, which conducted using the voice assistant device 200.

The method 550 may be a continuation of the method 500, or the method 550 may be performed independently of the method 500. For example, the user session may have been initiated as a visual session, and subsequently transferred to an audible session.

At 555, a user session is conducted as a visual session on the second electronic device (e.g., the electronic device 400), which has an output device 410, such as a display (e.g., a touchscreen), capable of providing a visual interface. The visual interface may be an interface for a web application, such as a banking session of a banking application of a financial institution. For example, similarly to the audible interface described above, a user may use the visual interface during the visual session to perform banking transactions (e.g., transfer funds), to obtain information from the financial institution (e.g., ask about mortgage rates) or to apply for a bank account, among other possibilities.

At 560, input data is received from the visual interface. The user may interact with the visual interface using an input device 415, such as a keyboard or touchscreen. The interaction with the visual interface is non-audible. The processor 405 of the electronic device 400 receives the user input and may provide the input data to the web application server 315 via the transceiver 420 (or other communication interface). The web application server 315 may then process the input data, for example to determine an appropriate response to provide via the visual interface, or to determine whether the visual interface should progress to a next visual interface state. In some examples, input data may be sent to the web application server 315 only in response to an explicit user input (e.g., selection of a "submit" option on the visual interface).

The received input enables the visual interface to progress through a plurality of visual interface states. Unlike an audible interface, a visual interface may include visual interface states that may be designed to receive multiple inputs in any arbitrary order (e.g., having multiple input fields) and/or may also provide outputs. Accordingly, although the visual interface and audible interface may both be used to interface with the same web application, the formats of each interface may differ, for example as discussed above with reference to FIGS. 5 and 6. In the present disclosure, a visual interface designed to accept multiple inputs may be referred to as accepting parallel inputs. In contrast, an audible interface typically accepts inputs in a serial manner.

At 565, optionally, an indication may be received indicating that the visual session is to be suspended. The indication may be provided through the visual interface on which the visual session is currently being conducted, or may be provided through another interface, such as an audible interface provided by a voice assistant device 200. The indication may include, for example, an explicit input from the user to suspend the visual session (e.g., selection of an option to "save my session" on the visual interface). The indication may also be implicit. For example, if the web application server 315 receives data input from a primarily audible first electronic device (e.g., the voice assistant device 200) associated with the user, this may indicate that the user wishes to continue the session using an audible session on the first electronic device instead of the second electronic device. In another example, the IoT device manager 350 may detect sensor data from the second electronic device (e.g., the location of the second electronic device (e.g., as detected by a location sensor) has moved), which may indicate that the user has entered the local environment 101 in which the voice assistant device 200 is located. In some examples, the IoT device manager 350 may implement a location detection module that receives location data (e.g., GPS data, beacon data, radiofrequency ID data, Bluetooth data, IP address data or MAC address data, among other possibilities) from respective sensors on the voice assistant device 200 and the electronic device 400, and determine whether the electronic device 400 has moved to within a predefined radius of the voice assistant device 200.

In some examples, the visual session may be suspended in response to other triggers, such as a prolonged time period without any user input into the visual interface, or loss of connection between the second electronic device and the web application server 315 (e.g., due to loss of wireless communication link or the second electronic device being powered off). In some examples, suspension of the audible session may be a security feature.

At 570, optionally, the current visual interface state may be saved by the web application server 315. For example, the current visual interface state may be saved into the session record database 347. The saved interface state may include information about the context of the visual session, such as information that has been received from the user and/or information that has been provided to the user (e.g., a current product page or completed input fields in an application). The current visual interface state may be saved when the visual session is suspended at 565, for example. The current visual interface state may also be saved at regular intervals, in response to explicit user input, or after each valid input, among other possibilities. Saving the current visual interface state may enable a suspended visual session to be resumed (whether as an audible session or as a visual session) at a later time (e.g., an hour later or a week later), at the same state.

At 575, the current visual interface state (which may have been saved at 570) is mapped to one of a plurality of audible interface states defined for an audible interface. Where the current visual interface state has been saved at 570, the saved visual interface state may be retrieved (e.g., from the session record database 347) and used to perform the mapping. This mapping may be performed by the web application server 315, using the interface map function 340, for example. The mapping may be performed using a set of rules and/or a pre-defined audible-visual interface map (e.g., using information from the mapping database 345), and/or may involve generation of the mapped audible interface state, as discussed previously. In some examples, performing the mapping may include generating the mapped audible interface state (e.g., using the interface generator 343), for example by performing a text to audio conversion.

At 580 the mapped audible interface state is pushed to the first electronic device, to enable the user session to be continued as an audible session. In some examples, user authentication on the primarily audible electronic device may be required before the user session can be continued as the audible session.

It should be noted that the mapped audible interface state may be pushed to the first electronic device in the background, without the user being aware. For example, the web application server 315 may push data to the first electronic device indicating the mapped audible interface state. The first electronic device may store this pushed data, and later generate the mapped audible interface state as an audible output, for example in response to user input (e.g., a voice command) to access the web application.

The user session may be continued as an audible session, and may end using the audible interface. In other examples, the user session may be transferred back to a visual session (e.g., using the method 500).

Figure 3:
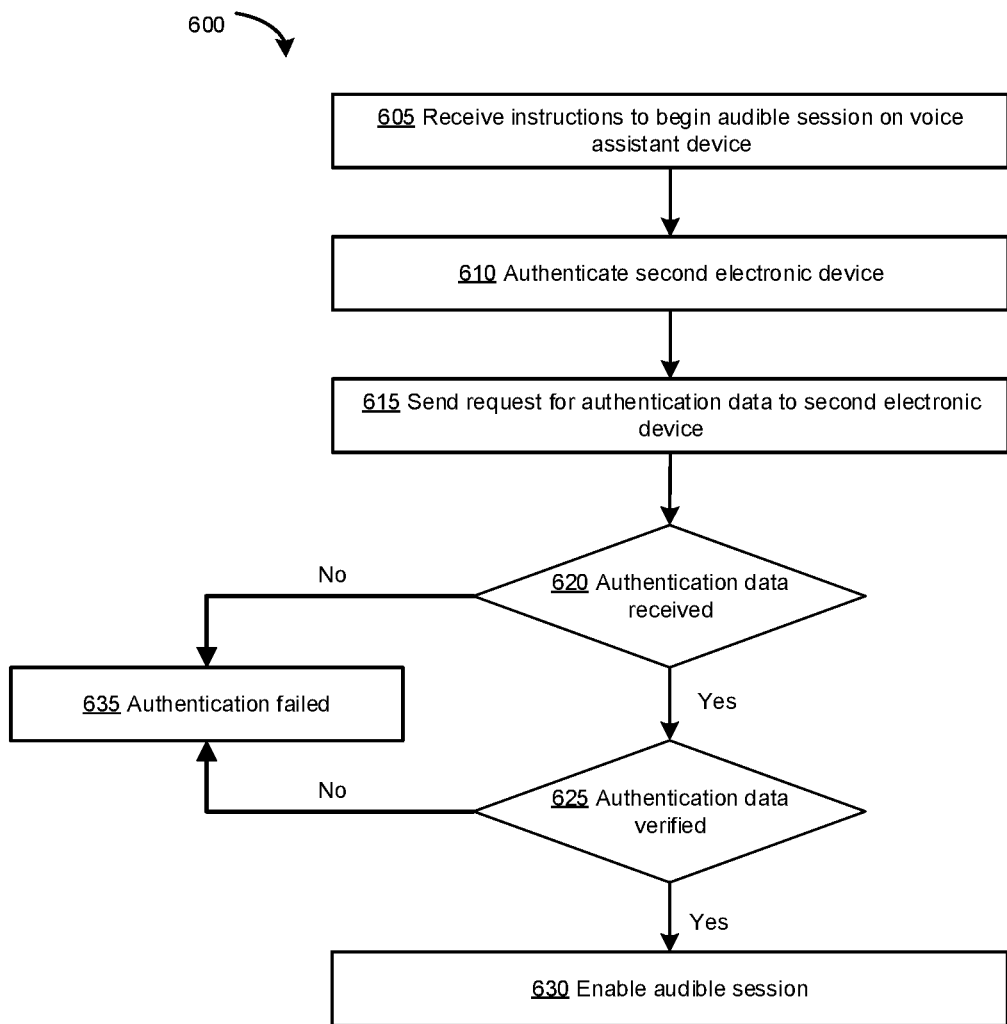
FIG. 3 is a flowchart illustrating an example method for authenticating a user for conducting an audible session in accordance with an example embodiment of the present disclosure.

Reference is now made to FIG. 3, illustrating an example method 600 for authenticating a user for an audible session (e.g., as performed at 505 of FIG. 2A).

At 605, instructions are received to begin an audible session on a first primarily audible electronic device (e.g., the voice assistant device 200). The instructions may indicate that a new user session is to be initiated as an audible session, or the instructions may indicate that an ongoing user session is to be continued as an audible session.

At 610, the web application server 315 may authenticate the second electronic device (e.g., an electronic device 400 other than the voice assistant device 200) associated with the same user. This may be performed using any suitable authentication techniques, such as an exchange of security certificates. This may be performed in the background, without the user being aware such authentication is taking place. In some examples, 610 may be performed by the authorization server API 325 of the web application server 315.

At 615, the web application server 315 sends a request for authentication data to the second electronic device. For example, the authorization server API 325 of the web application server 315 may generate the user authentication request. The web application server 315 typically requires a specific form of user authentication. However, the web application server 315 could permit user authentication in one of a number of approved forms of user authentication. User authentication may be performed via user credentials, such as a combination of user name and shared secret (e.g., password, passcode, PIN, security question answers or the like), biometric authentication, a digital ID protocol or a combination thereof among other possibilities. The request for authentication data may specify that authentication data is to be provided via the second electronic device, via the first electronic device, or either first or second electronic devices. For example, the request may require a passcode provided for display on the second electronic device to be provided by audible input to the first electronic device.

At 620, it is determined whether authentication data has been received. Authentication data may be received from the first or the second electronic device. For example, if the user provides input for authentication on the second electronic device, this input may be transmitted to the authorization server API 325 by the electronic device (e.g., using transceiver 420). In some examples, if the request sent at 615 specifies that authentication data is to be provided via a specified electronic device, any authentication data provided via a different device other than the specified device may be ignored. If authentication data is received, the method 550 proceeds to 625.

At 625, it is determined whether the authentication data is verified. For example, the authorization server API 325 may verify the received authentication data using suitable techniques, such as comparing against stored records.

In some examples, 620 and 625 may be performed on the second electronic device without involving the web application server 315. For example, the verification of authentication data may be performed locally on the electronic device 400, and the web application server 315 may be only informed whether authentication was verified or not verified. Performing verification locally may be preferable for increased security when authentication data includes biometric factors, such as fingerprint facial recognition, by ensuring that biometric data, such as biometric samples, biometric patterns and/or biometric matching criteria used for comparison, are stored locally. The local storage of biometric data reduces the likelihood that biometric data may be exposed compared with storing biometric data on the web application server 315.

At 630, after determining that authentication data has been verified (e.g., via performing the verification by the authorization server API 325 or via receiving data from the second electronic device indicating that local verification was successful), the audible session may be enabled on the primarily audible first electronic device.

If the authentication fails at 620 (e.g., no authentication data was received within a defined time period) or 625 (e.g., received authentication data fails verification), the method proceeds to 635 to indicate that authentication failed. A notification may be sent to the voice assistant device 200 and/or the second electronic device 400. The notification may be outputted to the user (e.g., audibly via the voice assistant device 200 and/or visually via the electronic device 400), and the user may be prompted to try again. A predetermined number of authentication attempts may be permitted before a lockout or other security measure is performed.

In some examples, authentication of a user for an audible session may be performed using other techniques. For example, a user may be authenticated for an audible session on a first primarily audible electronic device (e.g., the voice assistant device 200) by determining that the second electronic device (e.g., the electronic device 400) that is associated with the user (and which may have been authenticated as described at 610 above) is in the local environment 101 in which the first electronic device is located. This may provide a lower level of security, which may enable the user to access less sensitive information (e.g., accessing general, non-personal information) with less hassle.

FIG. 7 illustrates an example method 700 for transferring a user session between at least two electronic devices, in accordance with one example embodiment of the present disclosure. The method 700 may be similar to the method 500, but from the viewpoint of the primarily audible first electronic device (e.g., the voice assistant device 200). Details of the method 700 may be similar to that described above with respect to method 500, and will not be repeated below except where there are differences.

At 705, optionally, the user is authenticated prior to conducting the audible session. Authentication may be performed as described above with reference to FIG. 3, or using any suitable authentication technique.

At 710, a user session is conducted as an audible session on the first electronic device, using an audible interface.

At 715, audible input (e.g., voice input) is received, for example by the microphone 240 of the voice assistant device 200. The audible input may be processed by the processor 205 of the voice assistant device 200 (e.g., using NLP function 239), for example, by performing voice recognition to identify one or more words in the voice sample, matching the one or more words to a command, instruction or intent, and optionally one or more parameters relevant to the command, instruction or intent. The audible input may be used to generate input data representing the identified command, instruction or intent and one or more optional parameters, for example. The generated input data may be in a format recognizable by the voice assistant server 305 and/or the web application server 315.

At 720, the input data is provided by the voice assistant device 200 to the voice assistant server 305 via the communication subsystem 225 (e.g., via a wireless transceiver). The voice assistant server 305 forwards the API call to the web application server 315 providing the web application and its communication service, such as the banking session for the banking application of the financial instruction. Alternatively, in other embodiments the API call is sent by the voice assistant device 200 directly to the web application server 315 without handling by the voice assistant server 305.

Figure 4:
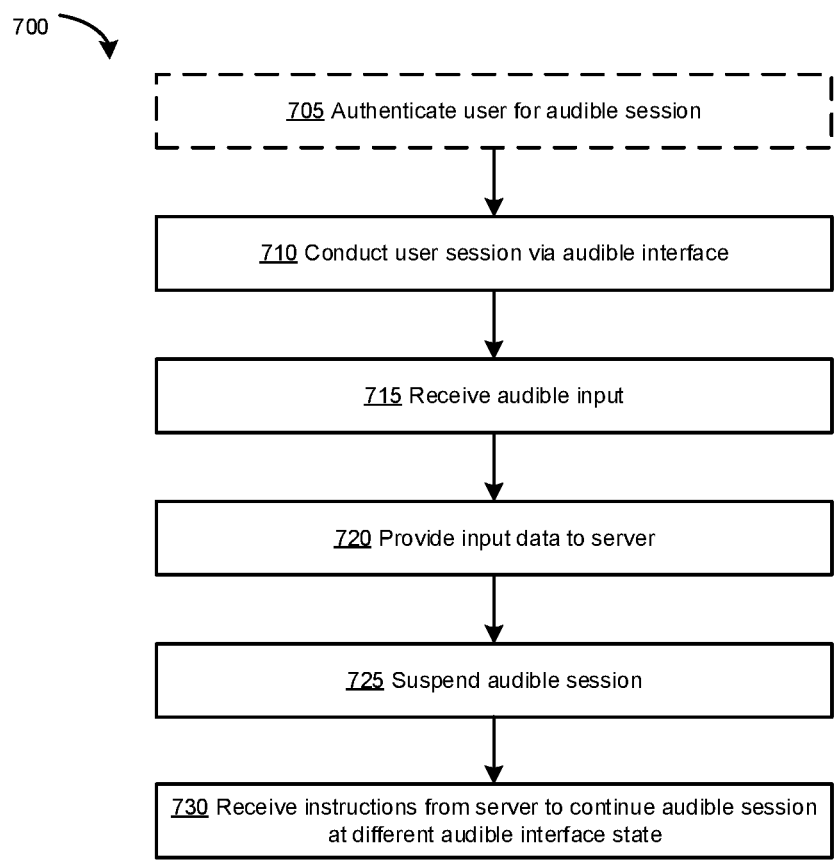
FIG. 4 is a flowchart illustrating an example method for conducting an audible session in accordance with an example embodiment of the present disclosure.

Although not shown in FIG. 4, the method 700 may include data communication between the web application server 315 and the voice assistant device 200 to progress the audible interface through a plurality of defined audible interface states. Audible inputs and audible outputs may be carried out via the audible interface at each audible interface state.

At 725, the audible session is suspended. Suspension of the audible session may include saving (e.g., at the web application server 315) a current audible interface state. Suspension of the audible session may be in response to an explicit voice command from the user to suspend the audible session (e.g., "pause my session") or to transfer the audible session to another device (e.g., "move to my phone"). Suspension of the audible session may also be in response to instructions received from the web application server 315 (e.g., if the web application server 315 receives data input from a second electronic device (e.g., the electronic device 400) indicating that the user wishes to continue the session using the second electronic device). Suspension of the audible session may also be in response to an internal trigger, for example if the voice assistant device 200 detects no audible input for a predetermined time period.

After the audible session has been suspended, the audible session may be transferred to a visual session on a second electronic device, for example as discussed above. In other examples, the audible session may be resumed as an audible session on the same voice assistant device 200. Where the audible session is continued as a visual session on the second electronic device, user input may be received via the visual interface. The visual session may subsequently be transferred back to the audible session, for example as discussed above.

At 730, the voice assistant device 200 received instructions from a server (e.g., the web application server 315 or the voice assistant server 305), to enable the audible session. Notably, the audible session may be continued at a different audible interface state than the state at which the audible session was suspended at 725. The resumption of the audible session at the different audible interface state reflects user input received via the visual interface during the visual session, for example, thus providing the user with a seamless transition between audible and visual interfaces.

Although the present disclosure is described, at least in part, in terms of methods, a person of ordinary skill in the art will understand that the present disclosure is also directed to the various components for performing at least some of the aspects and features of the described methods, be it by way of hardware (digital signal processors (DSPs), application specific integrated circuits (ASICs), or field-programmable gate arrays (FPGAs)), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a data manager) to execute examples of the methods disclosed herein.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising RAM memory, ROM memory, erasable programmable ROM (EPROM) memory, electrically EPROM (EEPROM) memory, and non-volatile RAM (NVRAM) memory. The above memory types are example only, and are thus not limiting as to the types of memory usable for storage of a computer program.

All values and sub-ranges within disclosed ranges are also disclosed. Also, although the systems, devices and processes disclosed and shown herein may comprise a specific plurality of elements/components, the systems, devices and assemblies may be modified to comprise additional or fewer of such elements/components. For example, although any of the elements/components disclosed may be referenced as being singular, the embodiments disclosed herein may be modified to comprise a plurality of such elements/components. The subject matter described herein intends to cover and embrace all suitable changes in technology.

The term "processor" may comprise any programmable system comprising systems using micro- or nano-processors/controllers, reduced instruction set circuits (RISC), ASICs, logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A server in communication with a primarily audible first electronic device in audible interaction with a user in absence of a visual interface, the server also in communication with a second electronic device having a visual output device, the server comprising:
   at least one communication interface;
   a processor coupled to the at least one communication interface; and
   a memory coupled to the processor, the memory having computer-executable instructions stored thereon, the instructions, when executed by the processor, causing the server to:
      conduct a user session as an audible-only interactive session via the audible interface provided by the first electronic device, a plurality of audible interface states being defined for the audible interface;
      receive a first signal from the first electronic device via the at least one communication interface, the first signal including audible input data from the audible interface, wherein the audible input data causes the audible interface to progress through the audible interface states;
      map a current audible interface state to one of a plurality of visual interface states defined for a visual interface, two or more of the plurality of audible interface states being mappable to a single visual interface state having multiple input fields, each of the two or more audible interface states corresponding to completion of a respective input field of the multiple input fields of the single visual interface state; and
      generate and send a second signal via the at least one communication interface to the second electronic device, the second signal including a pushed mapped visual interface state, the mapped visual interface state being the single visual interface state having one or more of the input fields completed according to the current audible interface state, to enable the user session to be continued as a visual session on the second electronic device.

2. The server of claim 1, wherein the instructions, when executed by the processor, further cause the server to map the current audible interface state to the mapped visual interface state by generating the mapped visual interface state.

3. The server of claim 2, wherein the instructions, when executed by the processor, further cause the server to generate the mapped visual interface state based on one or more contextual factors.

4. The server of claim 1, wherein the instructions, when executed by the processor, further cause the server to:
   save the current audible interface state; and
   map the current audible interface state to the mapped visual interface state after the saving.

5. The server of claim 4, wherein the instructions, when executed by the processor, further cause the server to:
   save the current audible interface state in response to detecting suspension of the visual session.

6. The server of claim 1, wherein the instructions, when executed by the processor, further cause the server to:
   during the visual session, receive a third signal from the second electronic device via the at least one communication interface, the third signal including input data from the visual interface;
   during the visual session, map a current visual interface state to one of the plurality of audible interface states; and
   generate and send a fourth signal via the at least one communication interface to the first electronic device, the fourth signal including a pushed mapped audible interface state, to enable the visual session to be continued as an audible session on the first electronic device.

7. The server of claim 1, wherein the instructions, when executed by the processor, further cause the server to, prior to conducting the user session as an audible session:
   in response to receipt of a fifth signal including instructions to initiate the audible session on the first electronic device, authenticate the user by:
      authenticating the second electronic device;
      sending a sixth signal via the at least one communication interface to the second electronic device, the sixth signal including a request to provide authentication data; and
      receiving a seventh signal from the first or the second electronic device via the at least one communication interface, the seventh signal including the authentication data.

8. The server of claim 1, wherein the second signal including the pushed mapped visual interface state includes a deep link to the mapped visual interface state of the visual interface.

9. The server of claim 1, wherein the instructions, when executed by the processor, further cause the server to generate and send the second signal including the pushed mapped visual interface state in response to:
   detecting the second electronic device has moved outside a vicinity of the first electronic device; or
   detecting user input on the second electronic device.

10. The server of claim 9, wherein the instructions, when executed by the processor, further cause the server to perform the mapping in response to the detecting.

11. The server of claim 1, wherein the instructions, when executed by the processor, further cause the server to perform the mapping in response to receiving an eighth signal via the at least one communication interface, the eighth signal including input data indicating instructions to continue the audible session as the visual session.

12. The server of claim 1, wherein the instructions, when executed by the processor, further cause the server to:
during the visual session, receiving a ninth signal from the second electronic device via the at least one communication interface, the ninth signal including input data from the visual interface; and
ending the user session by ending the visual session.

13. A method for transferring a user session between at least two electronic devices, the method comprising:
conducting the user session as an audible interactive session via an audible interface in audible interaction with a user in absence of a visual interface, the audible interface provided by a primarily audible first electronic device, a plurality of audible interface states being defined for the audible interface;
receiving audible input data from the audible interface, wherein the audible input data causes the audible interface to progress through the audible interface states;
mapping a current audible interface state to one of a plurality of visual interface states defined for a visual interface, two or more of the plurality of audible interface states being mappable to a single visual interface state having multiple input fields, each of the two or more audible interface states corresponding to completion of a respective input field of the multiple input fields of the single visual interface state; and
pushing the mapped visual interface state to a second electronic device having a visual output device for displaying the visual interface, the mapped visual interface state being the single visual interface state having one or more of the input fields completed according to the current audible interface state, to enable the user session to be continued as a visual session on the second electronic device.

14. The method of claim 13, wherein mapping the current audible interface state to the mapped visual interface state comprises generating the mapped visual interface state.

15. The method of claim 13, further comprising:
during the visual session, receiving input data via the visual interface;
during the visual session, mapping a current visual interface state to one of the plurality of audible interface states; and
pushing the mapped audible interface state to the first electronic device, to enable the visual session to be continued as an audible session on the first electronic device.

16. The method of claim 13, further comprising, prior to conducting the user session as an audible session:
in response to input data indicating instructions to initiate the audible session on the first electronic device, authenticating the user by:
authenticating the second electronic device;
sending a request to the second electronic device to provide authentication data; and
receiving the authentication data via the first or the second electronic device.

17. The method of claim 13, wherein pushing the mapped visual interface state to the second electronic device comprises sending, to the second electronic device, a deep link to the mapped visual interface state of the visual interface.

18. A primarily audible voice assistant device comprising:
an audio-only input device receiving audible input;
an audio-only output device providing audible output;
a communication interface in communication with a server;
a processor coupled to the input device, the output device and the interface; and
a memory coupled to the processor, the memory having computer-executable instructions stored thereon, the instructions, when executed by the processor, causing the voice assistant device to:
conduct an audible-only interactive session via an audible interface in audible interaction with a user in absence of a visual interface, a plurality of audible interface states being defined for the audible interface, two or more of the plurality of audible interface states being mappable to a single visual interface state having multiple input fields, each of the two or more audible interface states corresponding to completion of a respective input field of the multiple input fields of the single visual interface state;
receive audible input, wherein the audible input causes the audible interface to progress through the audible interface states;
provide a first signal to the server via the communication interface, the first signal including input data indicative of a current audible interface state of the audible interface;
suspend the audible-only interactive session; and
receive a second signal from the server via the communication interface, the second signal including instructions to continue the audible-only interactive session using a different audible interface state.

* * * * *